United States Patent
Dakhane et al.

(10) Patent No.: US 9,936,040 B2
(45) Date of Patent: Apr. 3, 2018

(54) SYSTEMS AND METHODS FOR PARTIAL VIDEO CACHING

(71) Applicant: Citrix Systems, Inc., Fort Lauderdale, FL (US)

(72) Inventors: Kapil Dakhane, Santa Clara, CA (US); Ioannis Beredimas, Thessaloniki (GR); Robert Kidd, Champaign, IL (US); Nicholas James Stavrakos, Los Altos, CA (US); Andrew Michael Penner, Savoy, IL (US)

(73) Assignee: Citrix Systems, Inc., Burlington, MA (US)

( * ) Notice: Subject to any disclaimer, the term of this patent is extended or adjusted under 35 U.S.C. 154(b) by 336 days.

(21) Appl. No.: 14/577,078

(22) Filed: Dec. 19, 2014

(65) Prior Publication Data

US 2016/0182671 A1   Jun. 23, 2016

(51) Int. Cl.
   *G06F 15/16* (2006.01)
   *H04L 29/08* (2006.01)
   *H04L 29/06* (2006.01)

(52) U.S. Cl.
   CPC ........ *H04L 67/2842* (2013.01); *H04L 65/605* (2013.01)

(58) Field of Classification Search
   CPC ... H04L 65/60; H04L 65/605; H04L 67/2842; H04L 9/083; H04L 9/14; G06F 17/30412; H04N 21/4702
   USPC ................................................. 709/219, 231
   See application file for complete search history.

(56) References Cited

U.S. PATENT DOCUMENTS

| 7,991,904 | B2 | 8/2011 | Melnyk et al. |
| 8,230,105 | B2 | 7/2012 | Melnyk et al. |
| 8,255,551 | B2 | 8/2012 | Melnyk et al. |
| 8,429,169 | B2 | 4/2013 | Koopmans et al. |
| 9,473,736 | B2 * | 10/2016 | Vince ................ H04N 21/25816 |
| 9,577,824 | B2 * | 2/2017 | Martell ..................... H04L 9/083 |
| 2009/0106356 | A1 * | 4/2009 | Brase .................. G06F 17/3002 709/203 |
| 2010/0083004 | A1 * | 4/2010 | Kirshenbaum ..... G06F 21/6218 713/193 |
| 2011/0246550 | A1 * | 10/2011 | Levari ............... G06F 17/30412 709/201 |
| 2012/0265901 | A1 * | 10/2012 | Swenson ............. H04L 65/1076 709/246 |
| 2012/0317308 | A1 | 12/2012 | Penner et al. |
| 2013/0080777 | A1 * | 3/2013 | Martell ..................... H04L 9/14 713/168 |
| 2013/0263167 | A1 | 10/2013 | Parthasarathy et al. |

(Continued)

*Primary Examiner* — Frantz Jean
(74) *Attorney, Agent, or Firm* — Allen, Dyer, Doppelt & Gilchrist, P. A.

(57) ABSTRACT

A cache server, a method, and a non-transitory computer-readable medium storing a set of instructions are disclosed. The apparatus comprises a memory and one or more processors configured to acquire one or more segments of media data associated with a first request, the first request being generated by one or more client devices, store the one or more segments associated with the first request, generate a key for each segment of the one or more segments associated with the first request, and generate a first set entry and a first set key for the one or more segments associated with the first request.

31 Claims, 12 Drawing Sheets

(56) References Cited

U.S. PATENT DOCUMENTS

| | | | |
|---|---|---|---|
| 2014/0025837 A1* | 1/2014 | Swenson | H04L 29/06027 |
| | | | 709/231 |
| 2014/0344468 A1* | 11/2014 | Saremi | H04L 65/105 |
| | | | 709/231 |
| 2015/0121417 A1* | 4/2015 | Vince | H04N 21/25816 |
| | | | 725/31 |
| 2015/0256600 A1 | 9/2015 | Dakhane et al. | |

* cited by examiner

SYSTEMS AND METHODS FOR PARTIAL VIDEO CACHING

BACKGROUND

At present, websites deliver millions of hours of video content to hundreds of millions of users each month. Some popular websites, such as YouTube™ (www.youtube.com), are entirely focused on delivering video content to users. Other popular websites, such as CNN™ (www.cnn.com), supplement traditional news and non-video content with short video clips or segments of special interest. Consumer interest in video content is so great that few popular websites have remained popular while providing no video content whatsoever.

One of the most popular types of content downloaded by users today is media content, such as video, image, and audio files. Media content comes in different formats, where some formats are more suitable for real-time media streaming than other formats. For example, HTTP Live Streaming (HLS) is a popular media streaming format because it breaks the overall stream into a sequence of small HTTP-based file downloads, each download loading one short segment of the overall stream. As the stream is played, the client device may select from a number of alternate short segments containing the same material encoded at a variety of data rates, allowing the streaming session to adapt to the available data rate. At the start of the streaming session, the client device downloads an extended M3U playlist (an .m3u8 file) containing the index data for the various segments available for this stream. Each segment can be stored as a separate .ts file compliant with the MPEG transport stream (TS) container format, and can include both video and audio streams, such as an H.264-encoded video stream and an advanced audio coding (AAC)-encoded audio stream.

On the other hand, some container formats are not well adapted for real-time streaming, especially for real-time streaming that may involve real-time adjustments of bitrate, frame resolution, and so forth. For example, the MPEG-4 Part 14 (MP4) format makes any such adjustments very difficult, because it requires that the index data (the "moov" atom) be transmitted in advance. Because the MP4 index data defines frame sizes for the entire stream, no frame can change in size after the index data is transmitted, which significantly constrains any real-time bitrate adjustments.

Notwithstanding the many websites that deliver enormous amounts of video content online to users, delivery of video content is still an expensive proposition. Delivering large video content files over the Internet tends to place a substantial processing load on the network infrastructure communicating such content as well as web servers transmitting such content to users (relative to delivering text or static image content). This burden is especially great on network infrastructures employing wireless technology, since wireless networks generally offer lower communication throughput than wired networks and wireless networks generally suffer from greater packet loss and location-dependent throughput than wired networks.

As a result of this burden, fewer users can be served by the network and web server infrastructure when serving video content relative to the number of users that can be served by the same network and web server infrastructure delivering text or still image content. Thus, companies that seek to appeal to a large user community either face increasing their content delivery capacity or risk losing users if their website seems slow due to overloaded web servers or an overloaded network infrastructure. Since customer loss can be fatal to a web business, most companies opt to increase their content delivery capacity as their customer base grows.

BRIEF DESCRIPTION OF THE DRAWINGS

Reference will now be made to the accompanying drawings, which illustrate exemplary embodiments of the present disclosure. In the drawings.

DETAILED DESCRIPTION OF THE DRAWINGS

Reference will now be made in detail to the exemplary embodiments consistent with the embodiments disclosed herein, the examples of which are illustrated in the accompanying drawings. Wherever possible, the same reference numbers will be used throughout the drawings to refer to the same or like parts.

The systems and methods described herein generally relate to storing partial media data, such as video media data, in a cache server. By storing this media data in a cache server, the amount and number of content requests to content servers can be decreased, thereby decreasing network congestion. Generally, the systems and methods operate by receiving a first request, e.g., a request or a full file request, for one or more segments of media data from a client device, acquiring the one or more segments from a content server, if a property of the one or more segments exceeds a threshold, storing the one or more segments in the cache server; generating a key for each segment of the one or more segments; generating a set entry and a set key associated with the one or more segments; and storing the segment keys and the set key.

Figure 1:
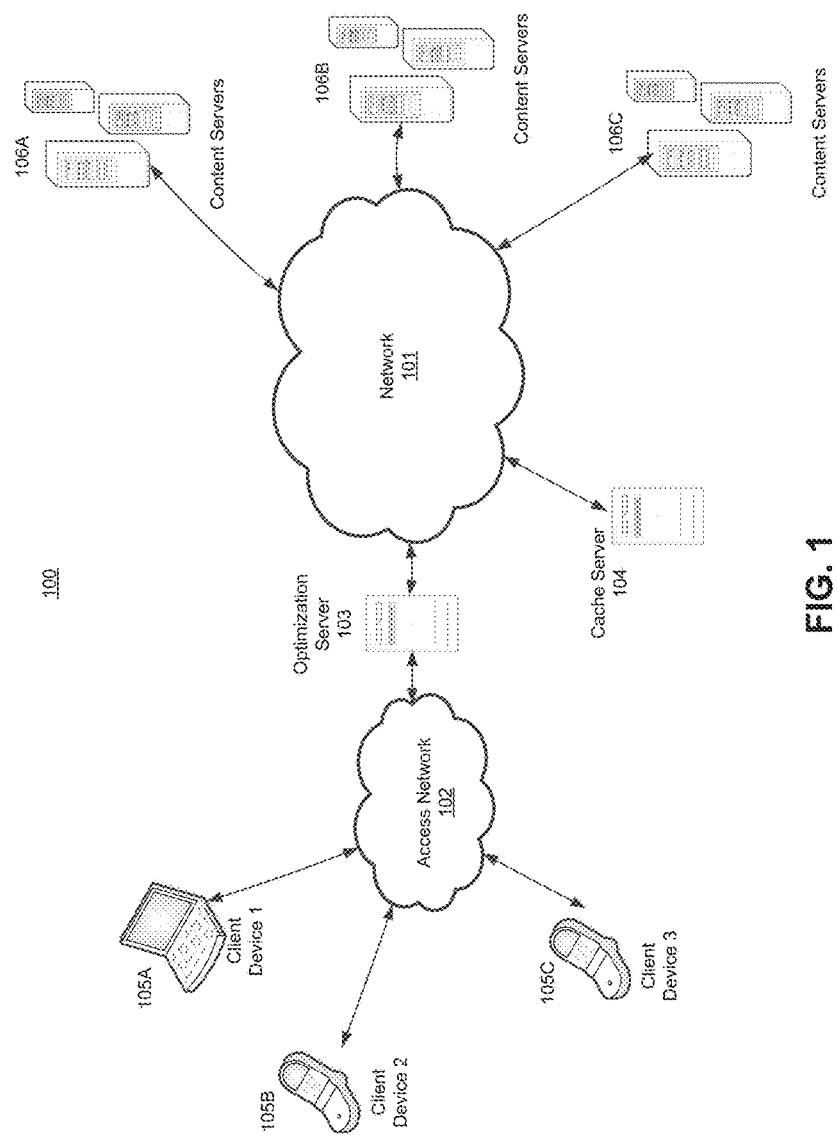
FIG. 1 is a simplified block diagram of an exemplary network system, consistent with embodiments of the present disclosure.

FIG. 1 is a block diagram of an exemplary system 100. Exemplary system 100 can be any type of system that transmits data packets over a network. For example, the exemplary system 100 can include one or more networks transmitting data packets across wired or wireless networks from servers to client devices. The exemplary system 100 can include, among other things, network 101, access network 102, optimization server 103, cache server 104, one or more client devices 105A-C, and one or more content servers 106A-C.

Network 101 can include any combination of wide area networks (WANs), local area networks (LANs), or wireless networks suitable for packet-type communications. In some exemplary embodiments, network 101 can be, for example, Internet and X.25 networks. Network 101 can communicate data packets with access network 102 and with one or more content servers 106A-C.

Access network 102 can include one or more radio networks, one or more cellular networks, one or more wide area networks (WANs), one or more local area networks (LANs), wireless networks suitable for packet-type communications, or any combination thereof. Access network 102 can be operated by, for example, service providers such as DSL service provides (e.g., AT&T®), broadband service providers (e.g., Comcast®), and numerous cellular service provides (e.g., AT&T®, Sprint®, and Verizon®). Access network 102 can employ technologies including digital subscriber line (DSL), cable broadband, 802.11 Wi-Fi, Global System for Mobile Communication (GSM), Universal Mobile Telecommunications System (UMTS) adopting Wideband Code Division Multiple Access (W-CDMA) radio access technology, CDMA2000, Worldwide Interoperability for Microwave Access (WiMax) and Long Term Evolution (LTE). For example, in some embodiments, access network 102 can be a General Packet Radio Service (GPRS) core network, which provides mobility management, session management and transport for Internet Protocol packet services in GSM and W-CDMA networks. One or more client devices (e.g., 104A-C) can communicate with access network 102, which in turn communicates with one or more content servers 106A-C directly or indirectly through network 101. The exemplary access network 102 can include, among other things, optimization server 103.

As shown in FIG. 1, optimization server 103 can be deployed at one or more locations within access network 102. Optimization server 103, however, is not limited to be located within the access network 102. Rather, it can be implemented at any intermediate nodes within the system 100. In some embodiments of access network 102, optimization server 103 can be incorporated in a gateway node that has visibility into data traffic between all client devices and content servers. For example, in the case of a mobile broadband access network using GSM, UMTS, or LTE technology, optimization server 103 can be located at any intermediate nodes including Traffic Optimization Platforms (TOP), Deep Packet Inspection (DPI) nodes, and other gateway nodes such as the Gateway GPRS Support Node (GGSN), the Serving Gateway node (SGW), or the Packet Data Network Gateway node (PGW). A TOP can perform web and video compression. A DPI node can examine the header (and possibly also the data part) of a packet as it passes an inspection point, searching for protocol non-compliance, viruses, spam, intrusions, or defined criteria to decide whether the packet may pass or if it needs to be routed to a different destination, or for the purpose of collecting statistical information. A GGSN can be responsible for the interworking between the GPRS network and external packet switched networks, such as the Internet and X.25 networks. A SGW can store the service parameters of the mobile broadband access network and can route and forward user data packets, while a PGW can perform policy enforcement, packet filtering, and packet screening.

Optimization server 103 can be implemented as a software program and/or one or more electronic devices, such as a proxy server, a router, a firewall server, a host, or any other electronic device that can intercept and facilitate communications between client devices 104A-C and content servers 106A-C. Optimization server 103 can include one or more hardware processors, such as one or more microprocessors or special-purpose digital signal processors. Optimization server 103 can also include a memory, such as a random access memory (RAM) or other dynamic storage device, for storing information and instructions to be executed by the one or more processors. Such instructions, when stored in non-transitory storage media accessible to the one or more processors, can render the optimization server into a special-purpose machine that is customized to perform the operations specified in the instructions. The term "non-transitory media" as used herein refers to any media storing data and/or instructions that cause a machine to operate in a specific fashion. Such non-transitory media can comprise non-volatile media and/or volatile media. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any flash memory, NVRAM, a cache, a register, any other memory chip or cartridge, and networked versions of the same.

Optimization server 103 can also include one or more communication interfaces that can provide a two-way data communication coupling to network 101 and access network 102 and through which optimization server 103 can communicate with client devices 105A-C, content servers 106A-C, cache server 104. For example, the communication interface can be an integrated services digital network (ISDN) card, cable modem, satellite modem, or a modem to provide a data communication connection to a corresponding type of telephone line. As another example, the communication interface can be a local area network (LAN) card to provide a data communication connection to a compatible LAN. Wireless links can also be implemented. In any such implementation, a communication interface sends and receives electrical, electromagnetic, or optical signals that carry digital data streams representing various types of information.

Optimization server 103 can process any packet type communications including multimedia data, such as audio data, video data, graphical data, or any combination thereof. Multimedia data transmission can be, for example, part of Transport Control Protocol (TCP) transactions. TCP transactions can include TCP requests from one or more client devices 105A-C and TCP responses from one or more content servers 106A-C. As an example, through one or more TCP transactions, a client device (such as client device 105A) can request multimedia data (e.g., a video clip) stored on a content server (e.g., content server 106A), and the content server can respond to the request by transmitting the multimedia data to the client device, which then acknowledges the receipt of the multimedia data. When optimization server 103 is deployed on an intermediate node that is located between the client device and the content server, it can process the multimedia data by, for example, obtaining, measuring, extracting, and storing a variety of transactional events and parameters associated with the multimedia data. It is appreciated that optimization server 103 can process multimedia data transmitted by more than one content server and requests transmitted by more than one client device.

Optimization server 103 can perform real-time, on-the-fly modifications to certain media formats. The modification process can include, for example, format container modification, transcoding, compressing, optimizing, dynamic bandwidth shaping (DBS), or any other real-time on-the-fly modifications of media data.

In some embodiments, optimization server 103 can perform the methods described in further detail below, such as a method for caching partial videos and a method for providing partially cached videos to a client device. In addition, optimization server 103 can apply media format substitute techniques, such as the techniques described in U.S. patent application Ser. No. 14/198,276, entitled "Systems and Methods for Media Format Substitution," the entire contents of which is hereby incorporated by reference in its entirety. In some embodiments, optimization server 103 can perform communication management and encoding techniques, such as the techniques described in U.S. Patent Publication No. 2012/0317308 entitled "On-Demand Adaptive Bitrate Management for Streaming Media Over Packet Networks," U.S. Pat. No. 7,991,904, U.S. Patent Publication No. 2011/0283012, and U.S. Patent Publication No. 2011/0283015, all of which are hereby incorporated by reference in their entireties.

Cache server 104 can be one or more electronic devices, such as a computer server, storage device, etc., that store cached media content. Cache server 104 can receive a request for cached media data from optimization server 103, process the request, and if the cached media data is available, provide the requested cached media data to optimization server 103. Cache server 104 can be a part of optimization server 103, or it can be remotely accessible by optimization server 103 (as shown in FIG. 1). In some embodiments, cache server 104 can be indexed. For example, cache server 104 can be indexed according to the techniques described in U.S. Pat. No. 8,429,169, entitled "Systems and Methods for Video Cache Indexing," which is hereby incorporated by reference in its entirety.

Each entry in cache server 104 can comprise at least a field for an index and a field for referencing the cached content. In some embodiments, each reference to cached content can be a directory name and file name for that cached content. In other embodiments, each reference to cached content may be another means of identifying cached content, such as a string that uniquely identifies the cached content. In some embodiments, cache server 104 is a data structure stored in main or secondary memory within the optimization server 103. In other embodiments, the cache server 104 may be comprised of data stored in a file or database table within the optimization server 103 or stored in a file or database table on a file or database server external to the optimization server 103.

One or more client devices 105A-C can be devices or applications, either in hardware or software, that communicate with access network 102. One or more client devices 105A-C can be implemented, for example, as an electronic device such as a computer, a PDA, a cell phone, a laptop, a netbook device, a smart phone devices, a tablet, a smartwatch, web TV equipment, a game console (e.g., Xbox™ or Playstation™), or any other device or application that can communicate with a network. While it is appreciated that that one or more client devices 105A-C can include wired devices, one or more client devices 105A-C are typically wireless devices since the quality of experience for users of wireless devices tends to fluctuate more based on the variation in one or more networks bandwidths and the number of subscribers using those networks.

One or more client devices 105A-C can make requests to and receive responses from one or more content servers 106A-C through access network 102 and network 101. For example, one or more client devices 105A-C can send request data to a content server to download or stream a particular media data file, and the content server can transmit the media data file to one or more client devices 105A-C. In some embodiments, the request data, the media data file, or both, can be routed through optimization server 103. Client device, e.g., client device 105A, can provide a display and one or more software applications, such as a media player or an Internet browser, for displaying the received media data to a user of the client device.

One or more content servers 106A-C can be any computer systems or software programs that are capable of serving the requests of clients, e.g., one or more client devices 105A-C. One or more content servers 106A-C can be any types of servers including content servers, application servers, communication servers, database servers, proxy servers, web servers, caching servers, and any other suitable servers. One or more content servers 106A-C can store and provide, among other things, multimedia data. Any requested multimedia data can be provided by one or more content servers. Further, content servers 106A-C can be broadcasting facilities, such as free-to-air, cable, satellite, and other broadcasting facilities configured to distribute media data to client devices 105A-C, in some embodiments, through optimization server 103.

Figure 2:
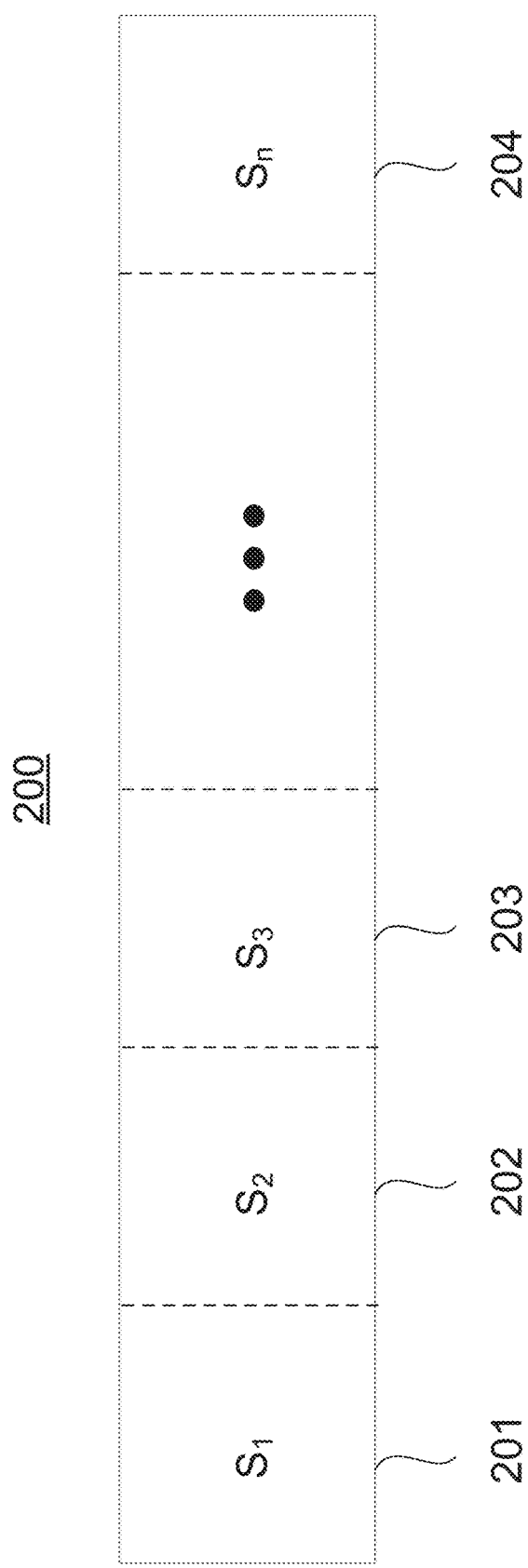
FIG. 2 is a simplified block diagram illustrating a simplified block diagram of an exemplary video, consistent with embodiments of the present disclosure.

FIG. 2 is a simplified block diagram illustrating a simplified block diagram of an exemplary video, consistent with embodiments of the present disclosure. Video object 200 can be comprised of several segments, such as segments $S_1$ 201, $S_2$ 202, $S_3$ 203, and $S_n$ 204. For example video object 200 can be broken into a sequence of small HTTP-based file segments 201-204 using a Dynamic Adaptive Streaming over HTTP (DASH) method, such as YouTube® DASH. Each segment, such as segment $S_1$ 201 can contain a short interval of playback time. Thus, video content that is potentially hours in duration, such as a sporting event or movie, can be broken into smaller segments and each segment can be made available at a variety of different bit rates, e.g., different levels of encoding. Each segment can contain additional metadata that provides additional segment information, such as timing within video object 200, URL address for the segment, video resolution, and bit rates. The length of each segment can be predefined by the protocol used, such as Apple's® HTTP Live Streaming or YouTube® DASH.

Figure 3:
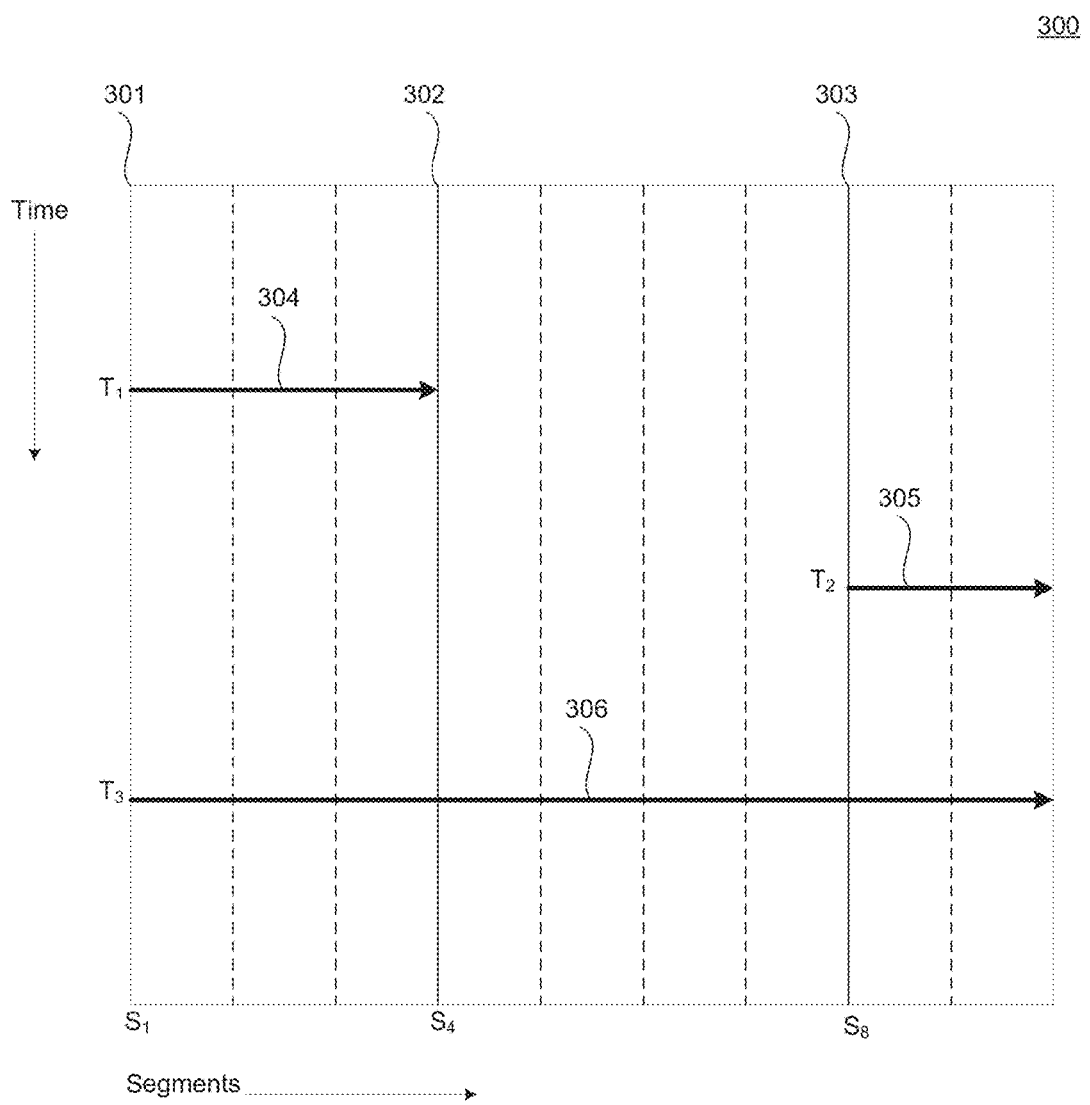
FIG. 3 is a simplified block diagram illustrating exemplary requests by one or more client devices, consistent with embodiments of the present disclosure.

FIG. 3 is a simplified block diagram illustrating exemplary requests by one or more client devices, consistent with embodiments of the present disclosure. As shown in FIG. 3, the optimization server can receive from the client device a request for media data, such as video object 200. The request can be received over any suitable protocol, including UDP and TCP/IP protocols such as HTTP, HTTPS, FTP, SSH, etc.

For example, the request can be an HTTP GET request that identifies the requested media data by a URL. In some embodiments, the request can be an HTTP range request or a full file request. A request can be a request for one or more segments, e.g., request 304 for segments $S_1$-$S_3$. Each segment can have its own URL and a request can be one or more HTTP GET requests that identify each segment by URL.

In FIG. 3, segments $S_1$ through $S_9$ represent segments from the same video object 200. One more client devices 105A-C can request, e.g., requests 304, 305, and 306, one or more segments from optimization server 103. In some embodiments, one or more client devices 105A-C can request a full file (not shown). A request can be for any number of segments, e.g. 3 segments or 300 segments. For example, request 304, made at time $T_1$, is a request for segments $S_1$-$S_3$. Similarly, request 305, made at time $T_2$, is a request for segments $S_8$ and $S_9$ and request 306, made at time $T_3$, is a request for segments $S_1$-$S_9$. In some embodiments, requests can be made by the same client device 105A. For example, request 304 can be client device 105A requesting initial streaming of video object 200 and request 305 can occur when a user of client device 105A skips ahead to $S_8$ of video object 200. In other embodiments, request 304 can be made by a first client device 105A and request 305 can be made by a second client device 105B.

In some embodiments, optimization server 103 can initiate a download of the requested media data from one or more content servers 106A-C. For example, the optimization server 103 can download segments $S_1$-$S_3$ from the content server identified in the URL of request 304. The optimization server can use any suitable protocol for initiating and downloading the media data, including UDP and TCP/IP protocols such as HTTP, HTTPS, FTP, SSH, etc. After initiating the download, the optimization server begins receiving the requested media data from the one or more content servers 106A-C. The requested media data can be received from the content server in one or more separate responses, such as HTTP 200 "OK" or HTTP 206 "Partial Content" responses. In some embodiments, as described in further detail below, optimization server 103 can initiate a download of the requested media data from cache server 104. In some embodiments, optimization server 103 can store some or all of the received media data either locally or in a remote server communicatively coupled to the optimization server.

Figure 4:
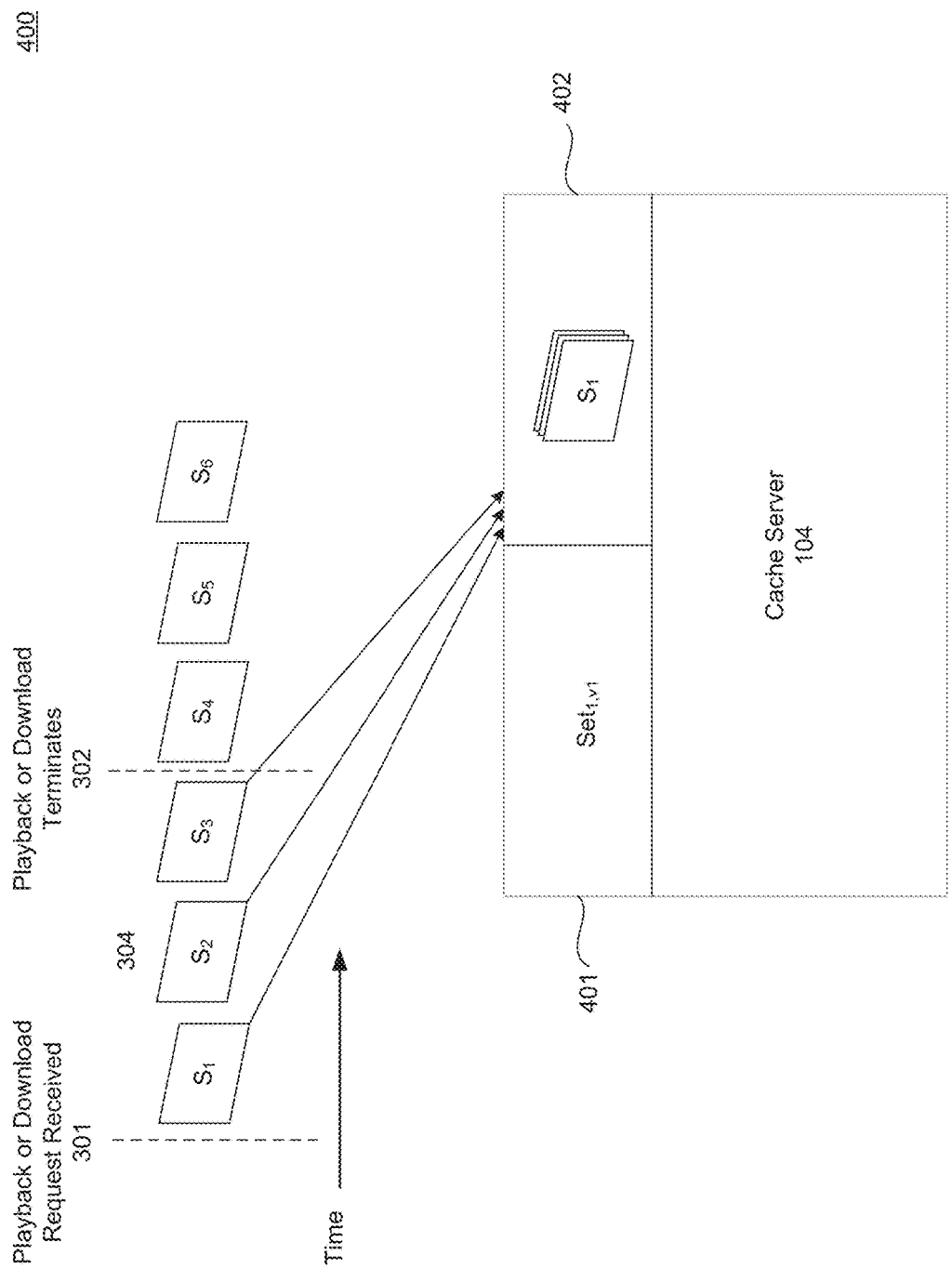
FIG. 4 illustrates a cache server storing segments requested by a first exemplary video request, consistent with embodiments of the present disclosure.

FIG. 4 illustrates a cache server storing segments requested by first exemplary video request, consistent with embodiments of the present disclosure. As shown in FIG. 4, optimization server 103 can receive a request 304 for segments $S_1$-$S_3$. Optimization server 103 can first request the segments $S_1$-$S_3$ from cache server 104. The cache server data structure can be comprised of a series of entries, wherein each entry further comprises a key, media content, e.g., a segment, and metadata associated with the media content. A key can be any unique identifier to identify a segment of media data and can be generated using the HTTP request for the segment. Metadata can include, for example, the location of the segment in the video object, e.g., segment 2, the quality of the segment, the URL for the segment, etc. Groups of related entries can be combined into a set, e.g., the set containing set metadata 402. A set can comprise a key and metadata associated with the segments. For example, the metadata can include the segments in the set, e.g., segments 1-3, the quality of each segment, and the URL for each segment.

Determinations of whether a requested segment, e.g., segment $S_1$, is stored in the cache server 104 are made by checking the cache data structure to determine whether a matching key exists. The cache server 104 determines that a reference to the requested segment is stored in the cache server 104 by comparing a key generated from the requested segment to the key field within each entry of the cache server 104. If a match exists between the key generated from the requested segment and the key field within an entry of the cache server, the segment referenced by the segment reference field within the entry of the cache data structure whose key field matched the generated key is provided to the optimization server 103. If a match exists between the key generated by the requested segment and a key in the cache server, the segment is present in the cache server, at least in original format but also possibly at the requested quality level. In some embodiments, as described in further detail below, the optimization server 103 can perform additional optimization, e.g., encoding, of the cached segment if the segment is not stored in the appropriate quality level.

If no match exists between the key generated by the requested segment and the key in the cache server, the content cache does not presently contain the requested content, in original format or at the appropriate quality level. As shown in FIG. 4, cache server 104 does not presently contain the requested segments $S_1$-$S_3$. Accordingly, optimization server 103 can initiate a download of the requested segments $S_1$-$S_3$ from one or more content servers 106A-C.

In some embodiments, cache server 104 can store segments $S_1$-$S_3$ downloaded from the one or content servers 106A-C. For example, cache server 104 can store segments $S_1$-$S_3$ if a property of those segments exceeds a threshold. Cache server 104 can store segments $S_1$-$S_3$ if a their number of views in a week exceeds 10,000 or average number of views per day exceeds 100, etc. Cache server 104 can create a key for each segment $S_1$, $S_2$, and $S_3$ and store each segment as a separate entry. Cache server 104 can also create set, e.g., $Set_{1,v1}$ 401 associated with the segments. A set entry can comprise a set key 401 and set metadata 402 associated with the segments that comprise the set. Exemplary methods for generating set key and set metadata are described in U.S. patent application Ser. No. 13/194,837, entitled "Systems and Methods for Video Cache Indexing," which is hereby incorporated by reference in its entirety. In some embodiments, a set key can be generated by characterizing all of the segments in the set. For example, the set containing segments $S_1$-$S_3$ of video "ABCD" could be associated with key "ABCD.s1_s3." In the example shown in FIG. 4, set metadata 402 can include the keys for each segment, $S_1$-$S_3$, that are part of the set. Metadata 402 can also include the timing of each segment, e.g., segment 1, the URL address for each segment, and the quality of each segment. In some embodiments, metadata 402 can include the hit count, e.g., the number of times the set was requested from cache server 104.

Figure 5:
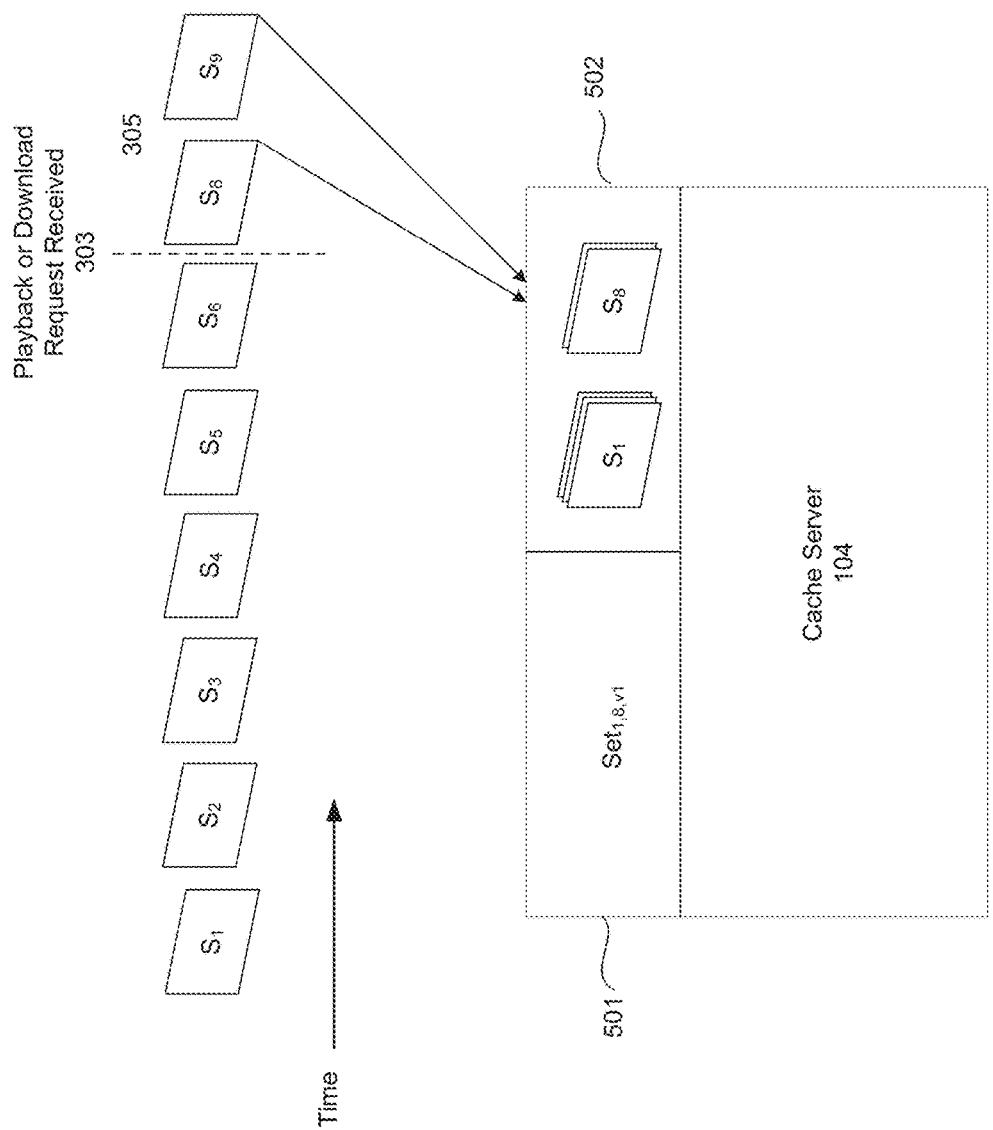
FIG. 5 illustrates a first embodiment of a cache server storing segments requested by a second exemplary video request, consistent with embodiments of the present disclosure.

FIG. 5 illustrates a first embodiment of a cache server storing segments requested by a second exemplary video request, consistent with embodiments of the present disclosure. As shown in FIG. 5, optimization server 103 can receive a second request 305 corresponding to segments $S_8$ and $S_9$ of video object 200. In some embodiments, request 305 can be sent from the same client device as request 304, e.g., client device 105A. For example, request 305 can occur when a user of a client device skips ahead to $S_8$ of video object 200. In other embodiments, request 205 can be from a different client device, e.g., client device 105B. Optimization server 103 can first request segments $S_8$ and $S_9$ from cache server 104. In this example, segments $S_1$-$S_3$ are stored in cache server 104, however, segments $S_8$ and $S_9$ are not presently stored in cache server 104. Accordingly, optimization server 103 can request segments $S_8$ and $S_9$ from one or more content servers 106A-C.

In some embodiments, cache server 104 can store segments $S_8$ and $S_9$ downloaded from the one or more content servers 106A-C. Cache server 104 can store segments $S_8$ and $S_9$ as separate cache entries, each with a unique cache key. A set does not have to contain a continuous block of segments. Because segments $S_8$ and $S_9$ are segments of the same video object 200 as segments $S_1$-$S_3$, and the timing of segments $S_8$ and $S_9$ is relatively close, i.e., there are only a few segments between $S_3$ and $S_8$, in some embodiments, segments $S_8$ and $S_9$ can be added to the same set as segments $S_1$-$S_3$. In this exemplary embodiment, a new set key 501, e.g. $Set_{1,8,v1}$, is generated for the set and the set metadata 502 is updated to include metadata associated with segments $S_8$ and $S_9$.

Figure 6:
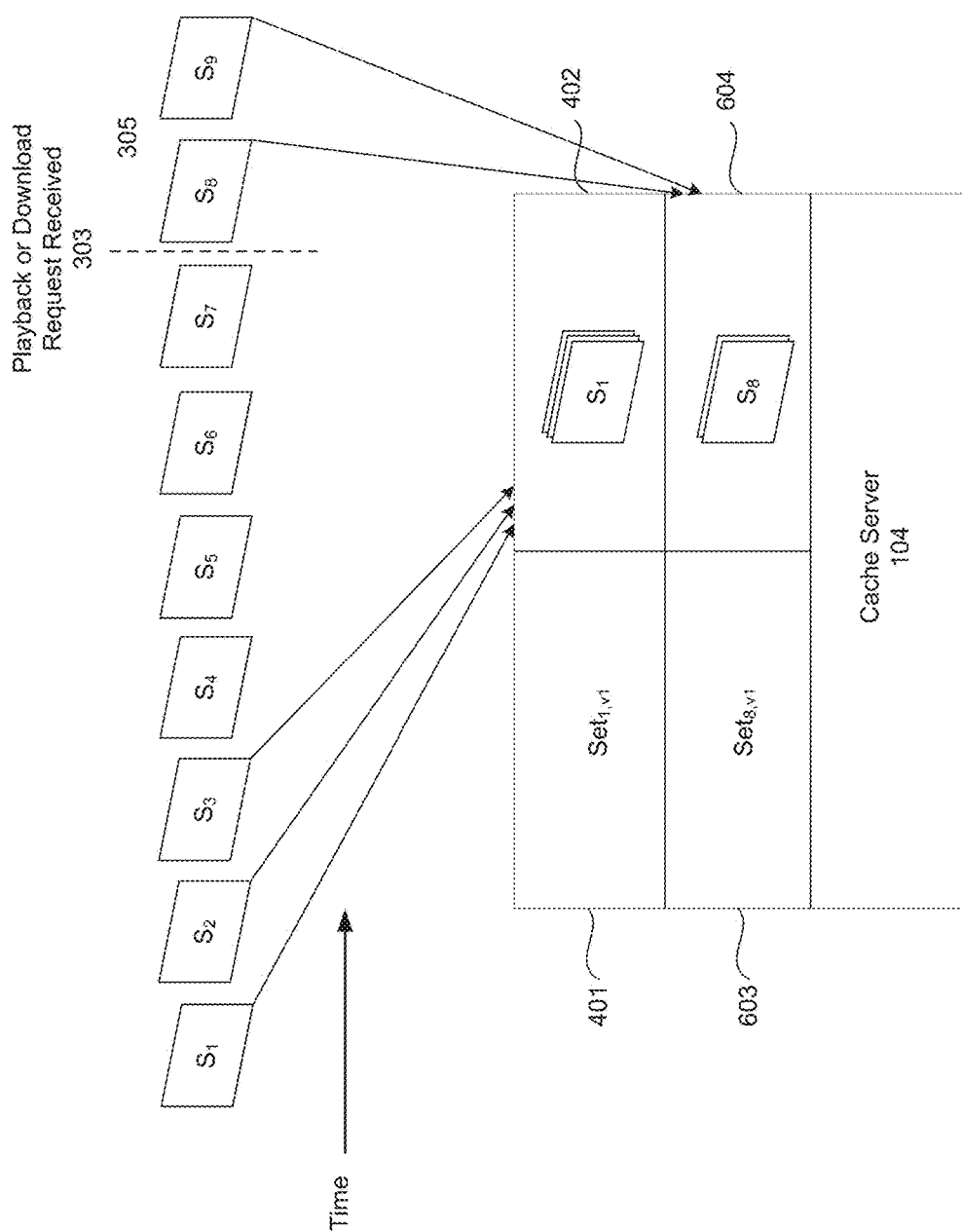
FIG. 6 illustrates a second embodiment of a cache server storing segments requested by a second exemplary video request, consistent with embodiments of the present disclosure.

FIG. 6 illustrates a second embodiment of a cache server storing segments requested by a second exemplary video request, consistent with embodiments of the present disclosure. As in FIG. 5, FIG. 6 illustrates the exemplary scenario where optimization server 103 receives a second request 305 corresponding to segments $S_8$ and $S_9$ of video object 200. In this example, segments $S_1$-$S_3$ are stored in cache server 104, however, segments $S_8$ and $S_9$ are not presently stored in cache server 104. Accordingly, optimization server 103 can request segments $S_8$ and $S_9$ from one or more content servers 106A-C.

In some embodiments, cache server 104 can store segments $S_8$ and $S_9$ downloaded from the one or more content servers 106A-C. Cache server 104 can store segments $S_8$ and $S_9$ as separate cache entries, each with a unique cache key. As shown in FIG. 6, a new set, $Set_{8,v1}$ can be created for segments $S_8$ and $S_9$. A new set key 601 and set metadata 604 can also be generated for new set $Set_{8,v1}$. A new set $Set_{8,v1}$ can be created because segments $S_8$ and $S_9$ are viewed significantly less often than segments $S_1$-$S_3$, e.g., the beginning of the video object 200.

When cache server 104 is full, the least recently used set and its associated segments can be evicted to create space for new segments. Individual segments are not evicted. In the exemplary scenario shown in FIG. 5, if segments $_8$ and $_9$ are the least recently used segments, $Set_{1,8,v1}$ can be evicted. Thus, segments $S_1$-$S_3$ and segments $S_8$ and $S_9$ will no longer be stored in cache server 104. On the other hand, in the exemplary scenario shown in FIG. 6, if segments $S_8$ and $S_9$ are the least recently used segments, $Set_{8,v1}$ can be evicted. Thus, segments $S_1$ and $S_3$ can continue to be stored in cache server 104, whereas segments $S_8$ and $S_9$ can be evicted from cache server 104.

Figure 7:
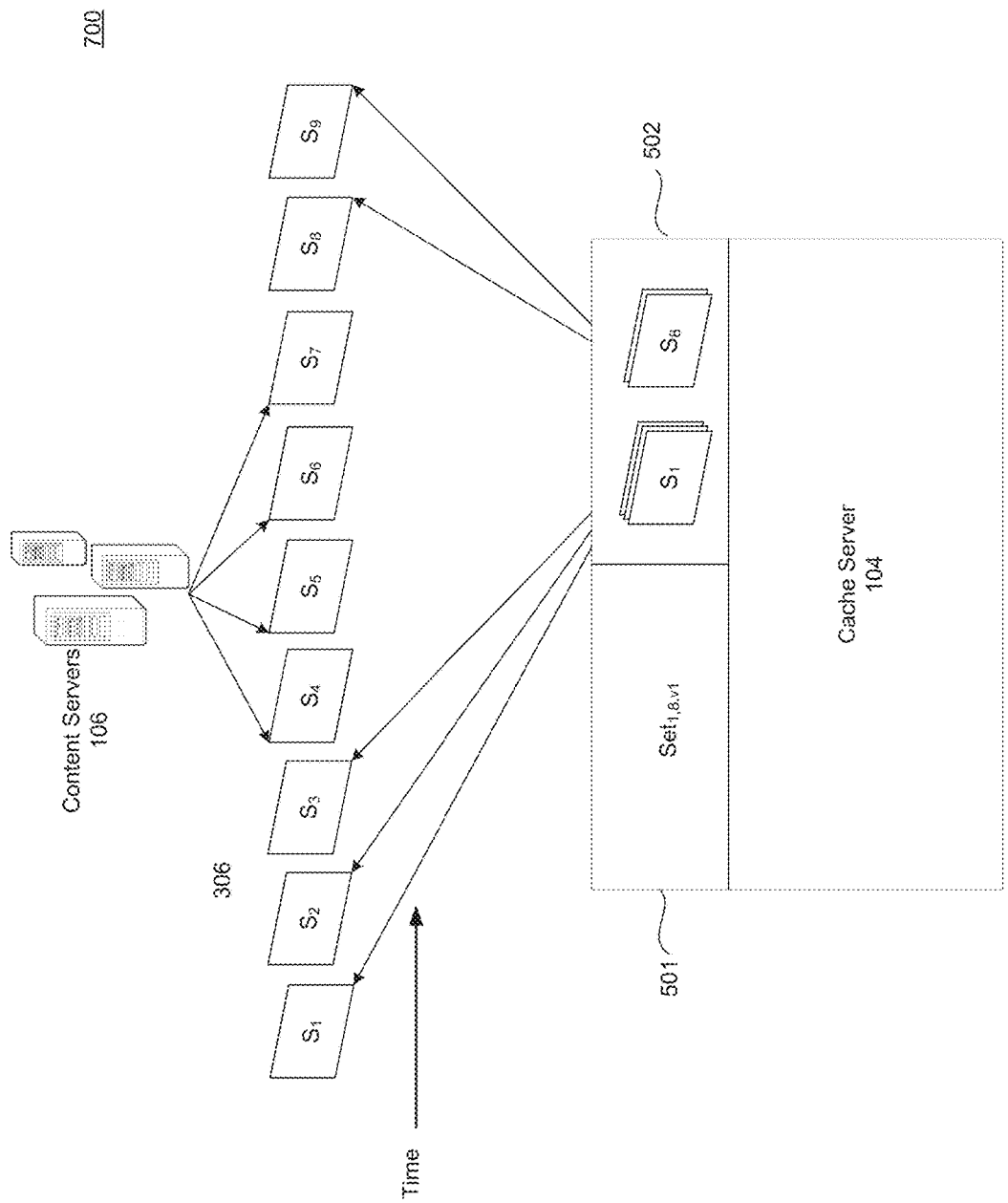
FIG. 7 illustrates an optimization server providing segments associated with a third exemplary video request to a client device, consistent with embodiments of the present disclosure.

FIG. 7 illustrates an optimization server providing segments associated with a third exemplary video request to a client device, consistent with embodiments of the present disclosure. As shown in FIG. 7, optimization server 103 can receive a request 306 from a client device. Request 306 is a request for segments $S_1$ through $S_9$ of video object 200. As shown in FIG. 3, request 306 occurs after request 304 for segments $S_1$-$S_3$ and request 305 for segments $S_8$ and $S_9$. Accordingly, as shown in FIG. 7, segments $S_1$-$S_3$ are stored in cache server 104, whereas segments $S_4$-$S_7$ must be retrieved from one of the content servers 106A-C.

After receiving request 306, optimization server 103 can request the next segment, e.g., segment $S_1$, from cache server 104. The optimization server 103 can provide cache server 104 with a key associated with segment $S_1$ and cache server 104 can determine whether a match exists by comparing the key to keys stored in cache server 104. If a match exists, cache server 104 can provide optimization server 103 with the segment, as well as metadata associated with the segment and its set. In this exemplary scenario, segment $S_1$ is stored in cache server 104 and cache server 104 can provide the requested segment $S_1$ to optimization server 103. Cache server 104 can also provide optimization server 103 with all other segments in segment $S_1$'s set, e.g. segments $S_2$, $S_3$, $S_8$, and $S_9$. Optimization server 103 can then provide the requested segment $S_1$ to the client device. After providing segment $S_1$ to the client device, optimization server 103 can request the next segments, $S_2$ and $S_3$, from cache server 104.

Optimization server 103 can generate requests, e.g. range requests or full file requests, to content servers 106A-C for the missing video segments, $S_4$-$S_7$. In some embodiments, optimization server 103 can schedule the download of segments $S_4$-$S_7$ to complete just-in-time for their turn in transmission. Segments $S_4$-$S_7$ can be stitched in with segments $S_1$-$S_3$ to be provided to the client device. In some embodiments, cache server 104 can store segments $S_4$-$S_7$ and can update the set and set key accordingly to include segments $S_4$-$S_7$. In some embodiments, a new set and set key can be generated to include segments $S_4$-$S_7$. Optimization server 103 can request segments $S_8$ and $S_9$ from cache server 104 and provide segments $S_8$ and $S_9$ to the client device.

In some embodiments, optimization server 103 can perform additional optimization of the segments received from either the cache server 104 or the content servers 106A-C. For example, network conditions can change during the transmission of the media data, such that dynamic encoding is needed to match the changing network conditions. An exemplary method for performing dynamic encoding is described in U.S. Patent Publication No. US 2012/0317308, entitled "On-Demand Adaptive Bitrate Management for Streaming Media over Packet Networks," which is hereby incorporated by reference in its entirety.

In some embodiments, optimization server 103 can determine, based on the received request from the client device, the type of the client device, e.g., its brand, model, and/or operating system, the type and version of the playback application, e.g., a web browser, a media player, a YouTube® mobile application, etc., or both. Based on this information, optimization server 103 can determine whether the client device and application support playback of a particular media format, such as the HTTP Live Streaming (HLS) or the YouTube® DASH format. Alternatively, optimization server 103 can determine whether the client device and application support the particular media format without first determining the particular type of device and playback application. In some embodiments, optimization server 103 can determine whether to perform media format substitution. An exemplary method of media format substitution is described in U.S. patent application Ser. No. 14/198,276, entitled "Methods and Systems for Media Format Substitution," which is hereby incorporated by reference in its entirety.

Figure 8:
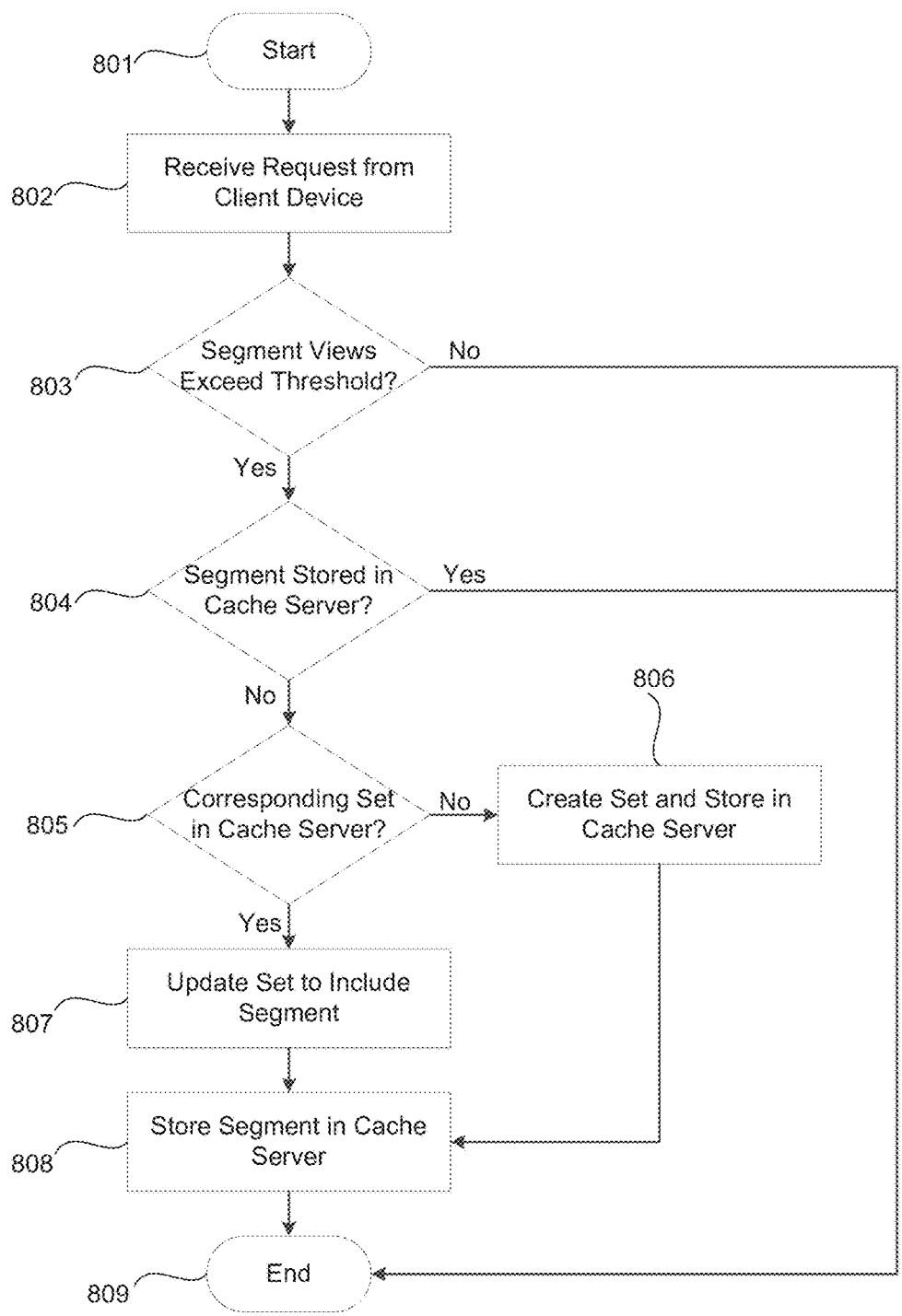
FIG. 8 is a flowchart representing an exemplary method for storing partial videos in a cache server, consistent with embodiments of the present disclosure.

FIG. 8 is a flowchart representing an exemplary method for storing partial videos in a cache server, consistent with embodiments of the present disclosure. While the following description indicates that method 800 can be performed by an electronic device such as a cache server (e.g., cache server 104), it is appreciated that method 800 can be performed at an optimization server (e.g., optimization server 103) alone or in combination with the cache server. While the flowchart discloses the following steps in a particular order, it is appreciated that at least some of the steps can be moved, modified, or deleted where appropriate, consistent with embodiments of the present disclosure.

At step 802, the cache server can acquire segments associated with a request from a client device. The request can be received over any suitable protocol, including UDP and TCP/IP protocols such as HTTP, HTTPS, FTP, SSH, etc. For example, the request can be an HTTP GET request that identifies the requested media data by a URL. The media data can be any combination of video data, audio data, image data, text data, and other types of data. In some embodiments, the cache server can initiate a download of the requested segments from the content server identified in the URL of the request. In other embodiments, the optimization server can initiate a download of the requested segments from the content server identified in the URL of the request. The optimization server and cache can use any suitable protocol for initiating and downloading the data, including UDP and TCP/IP protocols such as HTTP, HTTPS, FTP, SSH, etc. The requested segments can be received from the content server in one or more separate responses, such as HTTP 200 "OK" or HTTP 206 "Partial Content" responses. If the optimization server initiated the download request, the optimization server can then provide the downloaded segments to the cache server.

At step 803, the cache server can determine whether a property of the segment exceeds a threshold. For example, the cache server can determine whether the segment has been viewed a predetermined number of times, e.g., at least 10,000 views in the past week or if the segment has been viewed, on average, a predetermined number of times per day, e.g., average number of views per day exceeds 100, etc. Thus, the cache server can only store the most popular segments that are most likely to be subject to a playback request in the future.

At step 804, the cache server can determine whether the segment is already stored in the cache server. In some embodiments, if the segment is stored in the cache server, the cache server can determine whether the segment is "fresh." To make this determination, the cache server can, for example, request information associated with the segment (e.g., file timestamp, file headers, a fingerprint of the contents of the segment, etc.) from the content server, and compare the information to determine whether the segment on the content server differs from the segment on the cache server. If all or parts of segment on the cache server is determined to be fresh (e.g., identical to that on the content server), method 800 ends. If, however, all or some parts of segment are not in the cache server or are not fresh, the method can proceed to step 805.

At step 805, the cache server determines whether a set containing segments that are similar to the segment exists in the cache server. A set containing segments with similar timing from the same media data, e.g., video object 200, and of the same quality can be considered similar. For example, the fifth segment of a video can be similar to the first four segments of that same video. On the other hand, the 1000$^{th}$ segment of that video can be considered to not be similar to the first four segments because of the large gap between the segments. The cache server can make the determination of whether a set is s similar to a segment by searching the set keys and set metadata, e.g., set key 401 and set metadata 402. For example, the cache server can search for a set with a key extension corresponding to the video of the segment and can further search the metadata to see if the set contains any segments that are within a predetermined range, e.g., within 10 segments, of the segment.

If no corresponding set exists, e.g., no set with similarity, the cache server can create a new set entry (806). In creating this new set entry, the cache server can also create a new set key. On the other hand, if a corresponding set already exists in the cache server, at step 807, the cache server can update the set to include the segment. For example, in the above example, if segments 1-4 of a video ABCDE were already stored in the cache server with key "ABCDE.q0_s1-s4," segment 5 can be added to the set, and the set key can be updated to be "ABCDE.q0_s1-s5." In some embodiments, the cache server can update the metadata associated with the set to include information associated with segment 5.

At step 808, the cache server can store the segment. The segment is stored in the cache server as an entry. In some embodiments, the cache server can generate a segment key for the segment. For example, the segment key for segment 5 of a video ABCDE, of low quality can be "ABCDE.q0_s5." Alternatively, the segment key can be represented by the byte range of the segments, such as "ABDCE.q0_65536_131071." A method for generating the set key using characteristics of the segment are described in further detail in U.S. Pat. No. 8,429,169, entitled "Systems and Methods for Video Cache Indexing," which is hereby incorporated by reference in its entirety.

Figure 9:
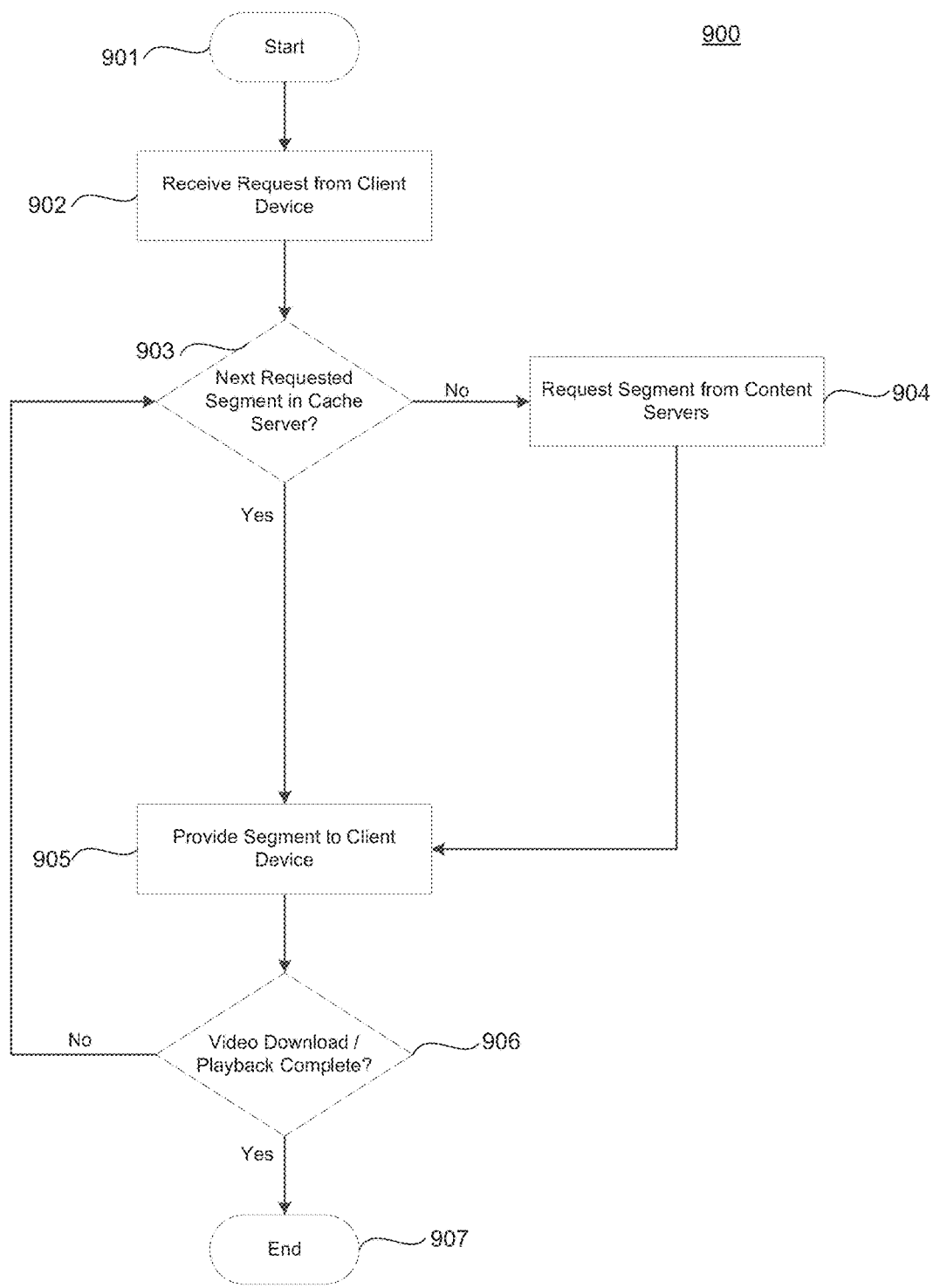
FIG. 9 is a flowchart representing an exemplary method for providing videos partially stored in a cache server to a client device, consistent with embodiments of the present disclosure.

FIG. 9 is a flowchart representing an exemplary method for providing videos partially stored in a cache server to a client device, consistent with embodiments of the present disclosure. While the following description indicates that method 900 can be performed by an electronic device such as an optimization server (e.g., optimization server 103), it is appreciated that method 900 can be performed at a cache server (e.g., cache server 104) alone or in combination with the optimization server. While the flowchart discloses the following steps in a particular order, it is appreciated that at least some of the steps can be moved, modified, or deleted where appropriate, consistent with embodiments of the present disclosure.

At step 902, the optimization server can receive a request, e.g., a range request or a full file request, from a client device. The request can be received over any suitable protocol, including UDP and TCP/IP protocols such as HTTP, HTTPS, FTP, SSH, etc. For example, the request can be an HTTP GET request that identifies the requested media data by a URL. The media data can be any combination of video data, audio data, image data, text data, and other types of data.

At step 903, the optimization server can determine whether the next requested segment is stored in the cache server. The optimization server can determine whether the requested segment is stored in the cache server by providing the cache server with a key corresponding to the requested segment. The cache server can compare the key generated from the requested segment to the key field within each entry of the cache server. If a match exists between the key generated from the requested segment and the key field within an entry of the cache server, the cache server can provide the segment referenced by the key to the optimization server. On the other hand, if the requested segment is not in the cache server, the optimization server can acquire the segment from the content server at step 904. For example, the optimization server can initiate a download request to the content server.

In some embodiments, after acquiring the requested segment, from either the cache server or the content server, the optimization server can perform additional optimization (not shown), e.g., encoding, of the cached segment if the segment is not stored in the appropriate quality level. The optimization can optionally update the cache server (not shown) to store the missing segments. In some embodiments, the optimization server can store in the cache server the original media content as downloaded from the content server. In other embodiments, instead of or in addition to storing the original media content, the optimization server can store in the cache server formatted, transcoded, optimized, and/or otherwise processed media data, such as segments of formatted media data (e.g., .ts files).

At step 905, optimization serve can provide the requested segments to the client device. In some embodiments, the optimization server can send the file in an HTTP 200 response. As part of the HTTP 200 response, the optimization server can specify the type and the quality of the transmitted segments. At step 906, the optimization determines whether video download or playback is complete, e.g., whether all of the requested segments have been provided to the client device. If video download or playback is not complete, method 900 returns to step 903 to determine whether the next requested segment in the request is stored in the cache server. Otherwise, if all segments in the request have been sent to the client device, method 900 ends (907).

Figure 10:
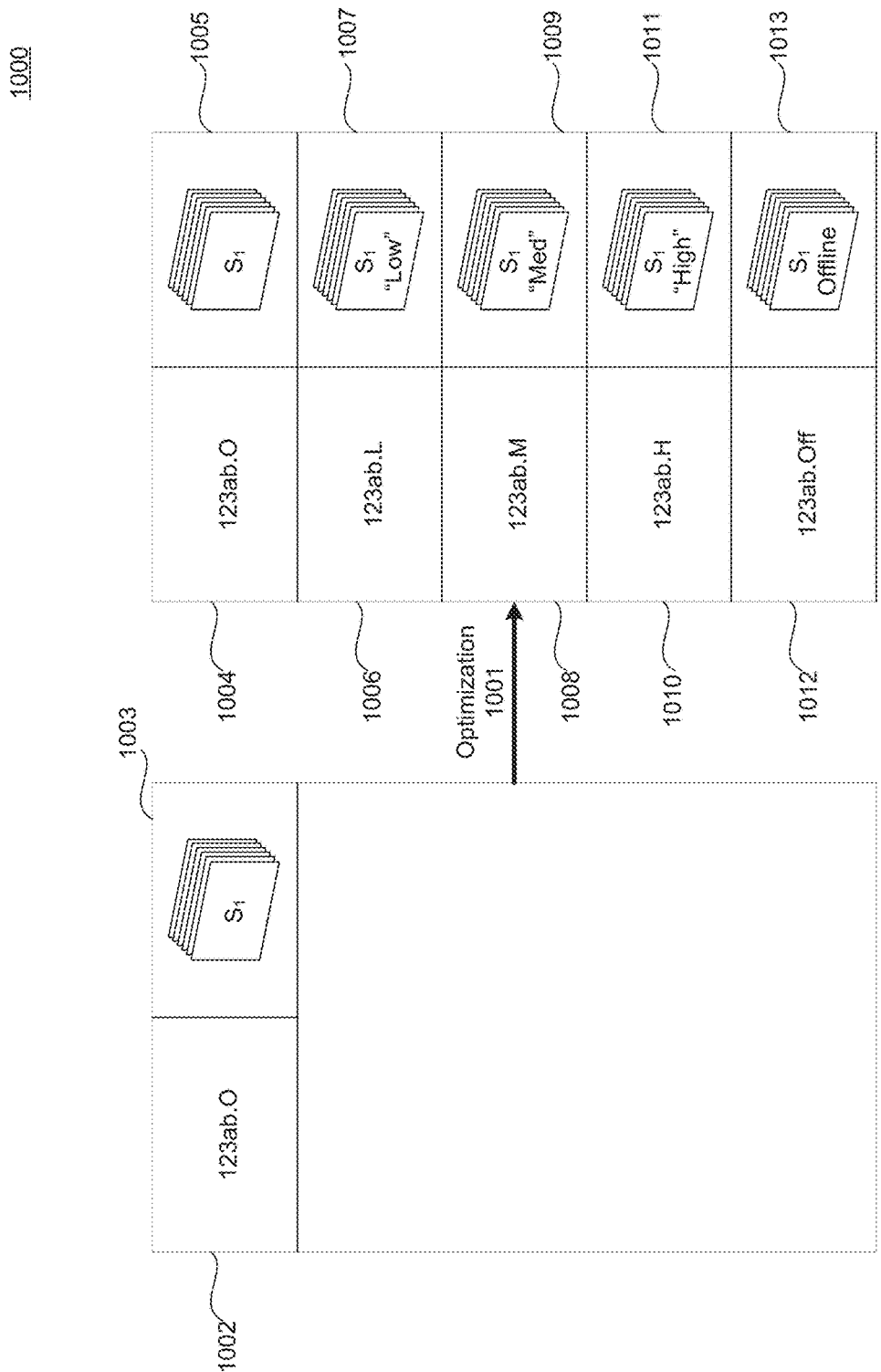
FIG. 10 is a simplified diagram illustrating an optimization of a video partially stored in a cache server, consistent with embodiments of the present disclosure.

FIG. 10 is a simplified diagram illustrating an optimization of a video partially stored in a cache server, consistent with embodiments of the present disclosure. In some embodiments, the optimization server can provide segments to the client device at various quality levels, e.g. "Low," "Medium," or "High," based on conditions particular to that client device. In particular, a user who creates video content to be shared with others on the Internet may capture and upload that video in a resolution and format that is unoptimized for downloading. One example of such resolution is "1080p," a form of high definition video. Additionally, that high definition video file may not utilize any compression technology to reduce the time required for users to download the high definition file. For example, a user downloading a movie in 1080p format onto a client device may find that the download takes an unacceptably long time to complete, due to network bandwidth limitations, and may also find that the client device is not able to take full advantage of the high resolution content based on the low resolution screen on the client device. Thus, users, network infrastructure providers, and website operators may find that files in original resolution and format are inconvenient to deal with.

In some embodiments, cache server 104 can store several versions of cached segments, at different quality levels (i.e., optimization levels). For example, in some embodiments, the content server can store segments in original format 1005 and in one or more of low 1007, medium 1009, high 1011, and offline 1013 resolution formats. The high, medium, and low resolution formatted segments can represent optimized versions of the original format segments that have been created for client devices of varying capacity to receive and display such segments. For example, a low resolution segment can be appropriate for a user on a client device, based on reduced network communication capacity and reduced screen resolution for that client device.

In some embodiments, these various versions of segments may be identified and differentiated from the content in original format by appending a quality level indicator onto the key of each version of the content. For example, if a segment originally had key "123ab", a filename for a version of that content stored in original format could be "123ab.O" (where "O" corresponds to "original") while filenames for low, medium, high, and offline quality versions of the content could be "123ab.L" 1006, "123ab.M" 1008, "123ab.H," 1010, and "123ab.Off" 1012, respectively.

Based on this naming convention, the cache server can recognize the quality level associated with each set of segments it stores, and can easily ascertain whether a version of the requested segment at a particular quality level was available.

In some embodiments, these various quality levels can constitute higher or lower resolution formats within the same encoding technology (e.g., MP4) and in other embodiments these various quality levels can represent segments stored in different encoding format. In some embodiments, both resolution and encoding format can vary between quality levels.

In some embodiments, the optimization server generates the requested segments at appropriate quality levels (1001), e.g., low, medium, or high, and provides them to the cache server for storage on an as-needed basis. For example, if a client device makes a request for a segment, and the cache server determines that the requested segment is not stored in the cache server even in original format, the cache server can acquire the requested segment, in original format, from the content server. Thereafter, the optimization server creates an optimized version of the requested segment at a quality level that is appropriate for the user requesting that segment. The optimization server can then provide the requested segment in original format and the optimized version of the requested segment to the cache server, which stores both versions. As discussed above, in some embodiments, versions of the requested segments stored within the content server can be identified and distinguished by appending a quality indicator to the filename of the segment.

Similarly, if a client device requests a segment from the optimization server, and the cache server has the requested segment stored in original format, but the cache server does not have the requested content segment at a quality level that is appropriate to the client device, the optimization server can optimize the original format content to create a copy of the requested segment in the quality level that is appropriate for the client device without interacting with the content server. The optimization server can then provide the optimized copy of the requested segment to the cache server for storage. In other embodiments, the optimization server can create optimized copies of requested segment corresponding to all quality levels upon a first request for a segment at a particular quality level.

Figure 11:
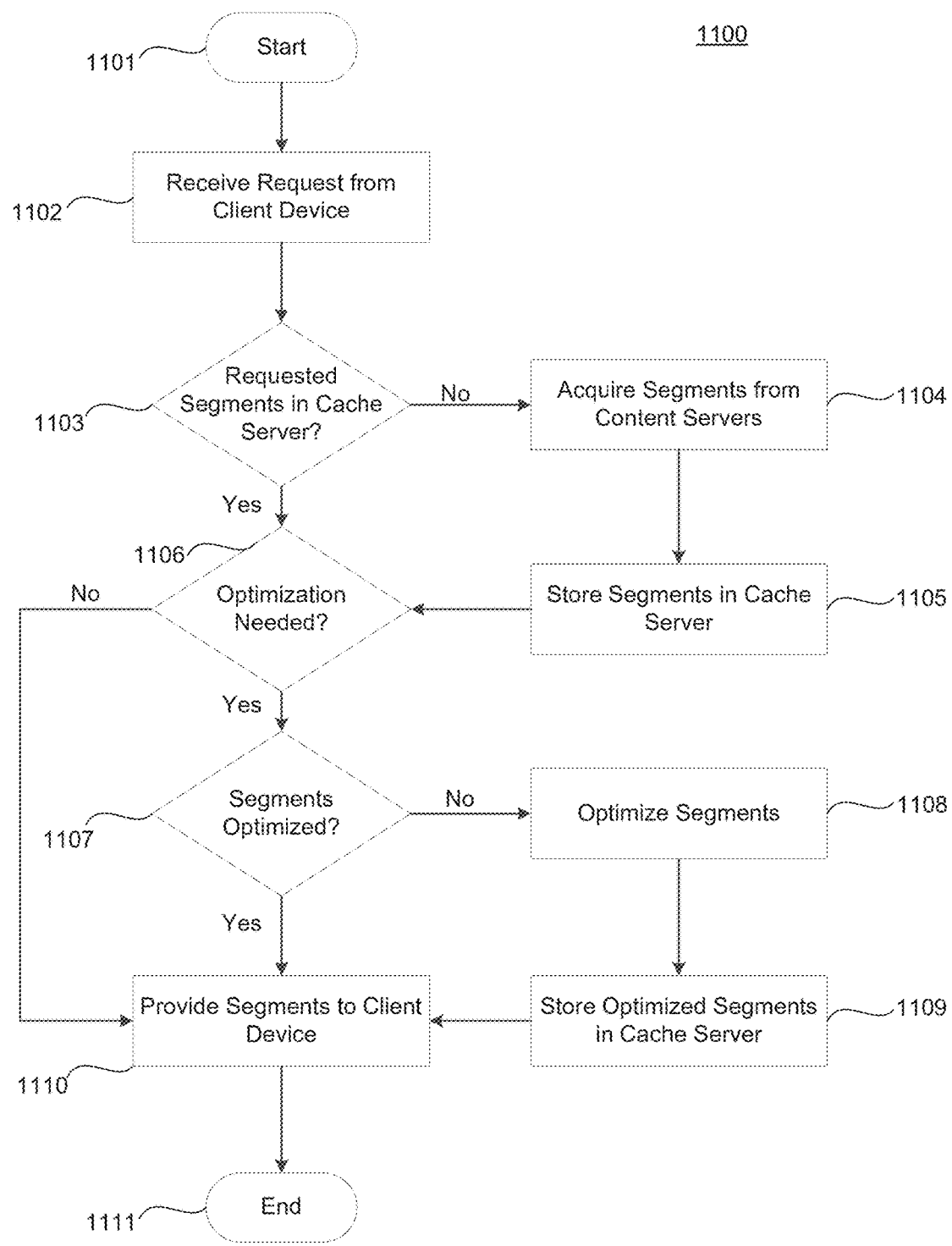
FIG. 11 is a flowchart illustrating an exemplary method for performing online optimization of a video partially stored in a cache server, consistent with embodiments of the present disclosure.

FIG. 11 is a flowchart illustrating an exemplary method for performing online optimization, e.g., on demand optimization, of a video partially stored in a cache server, consistent with embodiments of the present disclosure. While the following description indicates that method 1100 can be performed by an electronic device such as an optimization server (e.g., optimization server 103), it is appreciated that method 1100 can be performed at a cache server (e.g., cache server 104) alone or in combination with the optimization server. While the flowchart discloses the following steps in a particular order, it is appreciated that at least some of the steps can be moved, modified, or deleted where appropriate, consistent with embodiments of the present disclosure.

At step 1102, the optimization server can receive a request, e.g., a range request or a full file request, from a client device. The request can be received over any suitable protocol, including UDP and TCP/IP protocols such as HTTP, HTTPS, FTP, SSH, etc. For example, the request can be an HTTP GET request that identifies the requested media data by a URL. The media data can be any combination of video data, audio data, image data, text data, and other types of data. The request can be a request for one or more segments within the media data, e.g., segments S1-S3 of video object 200.

At step 1103, the optimization server can determine whether the requested segments are stored in the cache server. The optimization server can determine whether the requested segments are stored in the cache server by providing the cache server with keys corresponding to the requested segments. A segment key can be generated, for example, by characterizing the segment, e.g., by applying a hash algorithm to the segment, and storing the characterization result as a key corresponding to that segment. For example, optimization server can use key "123ab.M" to request the "Medium" quality version of the segments associated with key "123ab." The cache server can compare the keys generated from the requested segments to the key field within each entry of the cache server. If a match exists between the key generated from the requested segment and the key field within an entry of the cache server, the cache server can provide the segment referenced by the key in the cache server to the optimization server.

On the other hand, if the requested segment is not in the cache server, the optimization server can, at step 1104, acquire the requested segments from the content server. The optimization server can acquire the requested segments by initiating a download request or forwarding the received request to the content server. The optimization server can provide the acquired segments to the cache server for storage at step 1105. In some embodiments, the cache server can store the acquired segments using method 800 described in greater detail above.

At step 1106, the optimization server can determine whether optimization of the requested segments are needed. Optimization can be needed, for example, when download takes an unacceptably long time to complete, due to network bandwidth limitations, and or characteristics of the client device render it unable to take full advantage of the high resolution content based on the low resolution screen on the client device. If optimization is not needed, optimization server can provide the unoptimized segments to the client device at step 1110. If optimization is needed, at step 1107, the optimization server can determine whether the proper optimization level of the segments is stored in the cache server. For example, if bandwidth is limited, the optimization server can perform a request for a low quality version of the segment in the cache server. The cache server can search for the key corresponding to the low quality version of the segment, e.g., "123ab.L." If the low quality version is stored in the cache server, the cache server can provide the segment to the optimization server.

If the segments are not stored in the cache server at the appropriate quality level, the optimization server can optimize the segments at step 1108. Optimization can include, for example, encoding the segment in a higher or lower resolution format within the same encoding technology or applying different encoding formats. In some embodiments, at step 1109, the cache server can store the optimized version of the segments. The optimized version does not replace the original version of the segments, but can be stored as a separate cache entry. At step 1110, the optimization server can provide the segments to the client device, in response to the request received from the client device.

Figure 12:
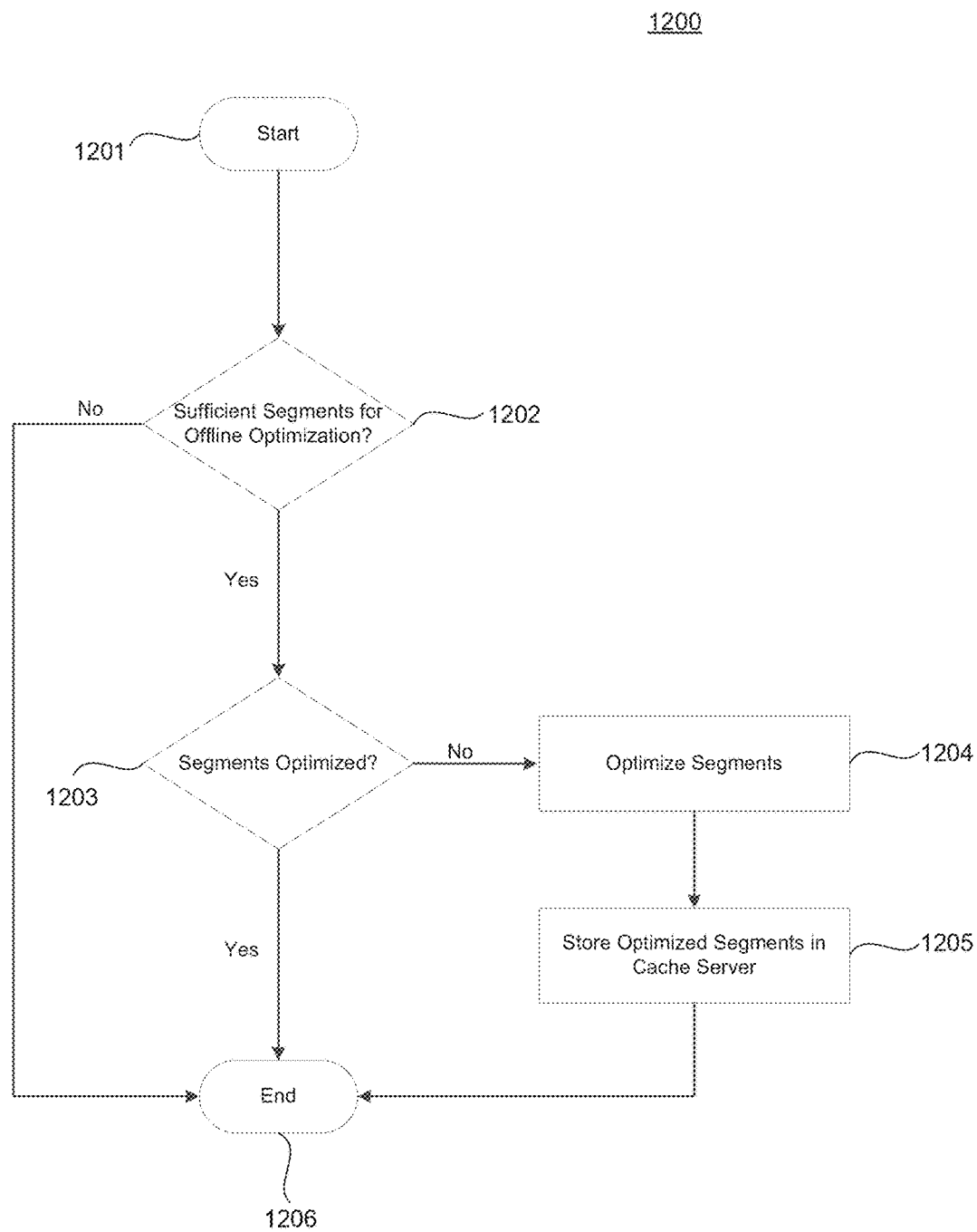
FIG. 12 is a flowchart illustrating an exemplary method for performing offline optimization of a video partially stored in a cache server, consistent with embodiments of the present disclosure.

FIG. 12 is a flowchart illustrating an exemplary method for performing offline optimization of a video partially stored in a cache server, consistent with embodiments of the present disclosure. While the following description indicates that method 1200 can be performed by an electronic device such as an optimization server (e.g., optimization server 103), it is appreciated that method 1200 can be performed at a cache server (e.g., cache server 104) alone or in combination with the optimization server. While the flowchart discloses the following steps in a particular order, it is appreciated that at least some of the steps can be moved, modified, or deleted where appropriate, consistent with embodiments of the present disclosure.

At step 1202, optimization server determines whether sufficient segments are stored in the cache server to perform offline optimization. Offline optimization is processor intensive, producing more compact files with better visual processing. To optimize a set using offline optimization, a significant portion of the media data, e.g., video object 200, is stored in the cache server. Further, offline optimization can be scheduled only when there are not active sessions for the online-optimized cache copy.

If a sufficient number of segments are stored in the cache server, at step 1203 the optimization server determines whether offline optimization has already been performed on the segments. If offline optimization was already performed, the method ends. Otherwise, the method proceeds to step 1204 where offline optimization is performed. Exemplary methods of offline optimization are described in further detail in U.S. application Ser. Nos. 13/436,658 and 13/494,032, both of which are hereby incorporated by reference in their entireties.

The methods disclosed herein may be implemented as a computer program product, e.g., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

In the preceding specification, the subject matter has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments may be apparent to those skilled in the art from consideration of the specification and practice of the embodiments disclosed herein.

What is claimed:

1. A cache server comprising:
   a memory; and
   one or more processors configured to:
     acquire one or more segments of media data associated with a first request, the first request being generated by one or more client devices;
     store the one or more segments associated with the first request;
     generate a key for each segment of the one or more segments associated with the first request; and
     generate a first set entry that includes a first set key for the one or more segments associated with the first request.

2. The cache server of claim 1, wherein the one or more processors are further configured to:
   store the one or more segments associated with the first request if a property of the one or more segments associated with the first request exceeds a threshold.

3. The cache server of claim 1, wherein the one or more processors are further configured to:
   acquire one or more segments of media data associated with a second request, the second request being generated by the one or more client devices;
   store the one or more segments associated with the second request;
   generate a key for each segment of the one or more segments associated with the second request;
   determine whether the one or more segments associated with the second request are associated with to the one or more segments associated with the first request;
   if the one or more segments associated with the second request are associated with the one or more segments associated with the first request, update the first set entry and the first set key; and
   if the one or more segments associated with the second request are not associated with the one or more segments associated with the first request, generate a second set entry that includes a second set key for the one or more segments associated with the second request.

4. The cache server of claim 1, wherein the one or more processors are further configured to:
   determine whether one or more segments associated with a third request are stored in the cache server;
   if the one or more segments associated with the third request are not stored in the cache server, acquire the one or more segments associated with the third request; and
   provide the one or more segments associated with the third request to an optimization server.

5. The cache server of claim 4, wherein the one or more segments associated with the third request can be provided from the optimization server to the one or more client devices.

6. The cache server of claim 5, wherein the provided one or more segments can be optimized by the optimization server before being provided to the one or more client devices.

7. The cache server of claim 6, wherein the one or more processors are further configured to:
   store the one or more optimized segments;
   generate a key for each optimized segment of the one or more optimized segments; and
   generate an optimized set entry that includes an optimized set key for the one or more optimized segments.

8. The cache server of claim 5, wherein a media format of the one or more segments associated with the third request can be modified at the optimization server before the one or more segments are provided to the one or more client devices.

9. The cache server of claim 8, wherein the one or more processors are further configured to:
   store the one or more modified segments;
   generate a key for each modified segment of the one or more modified segments; and
   generate a modified set entry that includes a modified set key for the one or more modified segments.

10. The cache server of claim 1, wherein the first set entry includes a plurality of cache entries; wherein each of the plurality of cache entries is associated with one segment of the one or more segments.

11. The cache server of claim 1, wherein the one or more segments are associated with timings that are within a predetermined range.

12. The cache server of claim 1, wherein the one or more segments are associated with a predetermined quality.

13. The cache server of claim 1, wherein the first set entry is associated with a count of a number of times the first set was requested from the cache server.

14. A method comprising:
   acquiring one or more segments associated with a first request, the first request being generated by one or more client devices;
   storing the one or more segments associated with the first request in a cache server;
   generating a key for each segment of the one or more segments associated with the first request; and
   generating a first set entry that includes a first set key for the one or more segments associated with the first request.

15. The method of claim 14, wherein the storing of the one or more segments occurs if a property of the one or more segments associated with the first request exceeds a threshold.

16. The method of claim 14, further comprising:
   acquiring one or more segments of media data associated with a second request, the second request being generated by one or more client devices;
   storing the one or more segments associated with the second request in the cache server;
   generating a key for each segment of the one or more segments associated with the second request;
   determining whether the one or more segments associated with the second request are associated with the one or more segments associated with the first request;
   responsive to determining that the one or more segments associated with the second request are associated with the one or more segments associated with the first request, updating the first set entry and the first set key; and
   responsive to determining that the one or more segments associated with the second request are not associated with the one or more segments associated with the first request, generating a second set entry that includes a second set key for the one or more segments associated with the second request.

17. The method of claim 14, further comprising:
   determining whether one or more segments associated with a third request are stored in the cache server;
   responsive to determining that the one or more segments associated with the third request are not stored in the cache server, acquiring the one or more segments associated with the third request; and
   providing the one or more segments associated with the third request to an optimization server.

18. The method of claim 17, further comprising providing the one or more segments associated with the third request to the one or more client devices.

19. The method of claim 17, wherein the provided one or more segments can be optimized by the optimization server before being provided to the one or more client devices.

20. The method of claim 19, further comprising:
   storing the one or more optimized segments;

generating a key for each optimized segment of the one or more optimized segments; and generating an optimized set entry that includes an optimized set key for the one or more optimized segments.

21. The method of claim 17, wherein a media format of the one or more segments associated with the third request can be modified at the optimization server before the one or more segments are provided to the one or more client devices.

22. The method of claim 21, further comprising:
storing the one or more modified segments;
generating a key for each modified segment of the one or more modified segments; and
generating a modified set entry that includes a modified set key for the one or more modified segments.

23. A non-transitory computer-readable medium storing a set of instructions that are executable by one or more processors to cause the one or more processors to perform a method comprising:
acquiring one or more segments associated with a first request, the first request being generated by one or more client devices;
storing the one or more segments associated with the first request in a cache server;
generating a key for each segment of the one or more segments associated with the first request; and
generating a first set entry that includes a first set key for the one or more segments associated with the first request.

24. The non-transitory computer-readable medium of claim 23, wherein the storing of the one or more segments occurs if a property of the one or more segments associated with the first request exceeds a threshold.

25. The non-transitory computer-readable medium of claim 23, further comprising instructions executable by the one or more processors to cause the one or more processors to perform:
acquiring one or more segments of media data associated with a second request, the second request being generated by one or more client devices;
storing the one or more segments associated with the second request in the cache server;
generating a key for each segment of the one or more segments associated with the second request;
determining whether the one or more segments associated with the second request are associated with to the one or more segments associated with the first request;
if the one or more segments associated with the second request are associated with the one or more segments associated with the first request, updating the first set entry and the first set key; and
if the one or more segments associated with the second request are not associated with the one or more segments associated with the first request, generating a second set entry that includes a second set key for the one or more segments associated with the second request.

26. The non-transitory computer-readable medium of claim 23, further comprising instructions executable by the one or more processors to cause the one or more processors to perform:
determining whether one or more segments associated with a third request are stored in the cache server;
if the one or more segments associated with the third request are not stored in the cache server, acquiring the one or more segments associated with the third request; and
providing the one or more segments associated with the third request to an optimization server.

27. The non-transitory computer-readable medium of claim 26, further comprising instructions executable by the one or more processors to cause the one or more processors to perform:
providing the one or more segments associated with the third request to the one or more client devices.

28. The non-transitory computer-readable medium of claim 26, wherein the provided one or more segments can be optimized by the optimization server before being provided to the one or more client devices.

29. The non-transitory computer-readable medium of claim 28, further comprising instructions executable by the one or more processors to cause the one or more processors to perform:
storing the one or more optimized segments;
generating a key for each optimized segment of the one or more optimized segments; and
generating an optimized set entry that includes an optimized set key for the one or more optimized segments.

30. The non-transitory computer-readable medium of claim 26, wherein a media format of the one or more segments associated with the third request can be modified at the optimization server before the one or more segments are provided to the one or more client devices.

31. The non-transitory computer-readable medium of claim 30, further comprising instructions executable by the one or more processors to cause the one or more processors to perform:
storing the one or more modified segments;
generating a key for each modified segment of the one or more modified segments; and
generating a modified set entry that includes a modified set key for the one or more modified segments.

* * * * *